Feb. 16, 1932.  O. HARTSOCK  1,845,411
WEED SKINNER
Filed Dec. 15, 1930   2 Sheets-Sheet 1

INVENTOR.
Oce Hartsock

BY *Lancaster, Allwine & Rommel*
ATTORNEYS.

Feb. 16, 1932. O. HARTSOCK 1,845,411
WEED SKINNER
Filed Dec. 15, 1930 2 Sheets-Sheet 2

INVENTOR.
Oce Hartsock

BY
Lancaster, Allwine & Rommel
ATTORNEYS.

Patented Feb. 16, 1932

1,845,411

UNITED STATES PATENT OFFICE

OCE HARTSOCK, OF WALLA WALLA, WASHINGTON

WEED SKINNER

Application filed December 15, 1930. Serial No. 502,582.

The present invention relates to agricultural implements and the primary object of the invention is to provide a non-clogging weed skinner.

In the present types of weed skinners, the blades are attached to a crook beam which extends directly rearward from the blades and forms an obstacle for collecting the cut weeds thus causing frequent delays in the weeding process.

It is therefore a further object of the invention to provide a weed skinner which will dispense with the usual crook beam and prevent collecting of the weeds upon any structural portion of the skinner.

A further object of the invention is to provide a weed skinner wherein the blades are carried by pusher rods or arms between which is mounted a wheel serving to press the cut weeds upon the ground in advance of any portion of the machine upon which the weeds may collect.

A further object of the invention is to provide a device of this character which is of extremely simple construction and one which may be incorporated in either a single or gang type of skinner.

A still further object resides in the novel arrangement whereby renewal of parts may be easily made.

Other objects and advantages of the invention will be apparent during the course of the following detailed description, taken in connection with the accompanying drawings forming a part of this specification and in which drawings.

Figure 1:
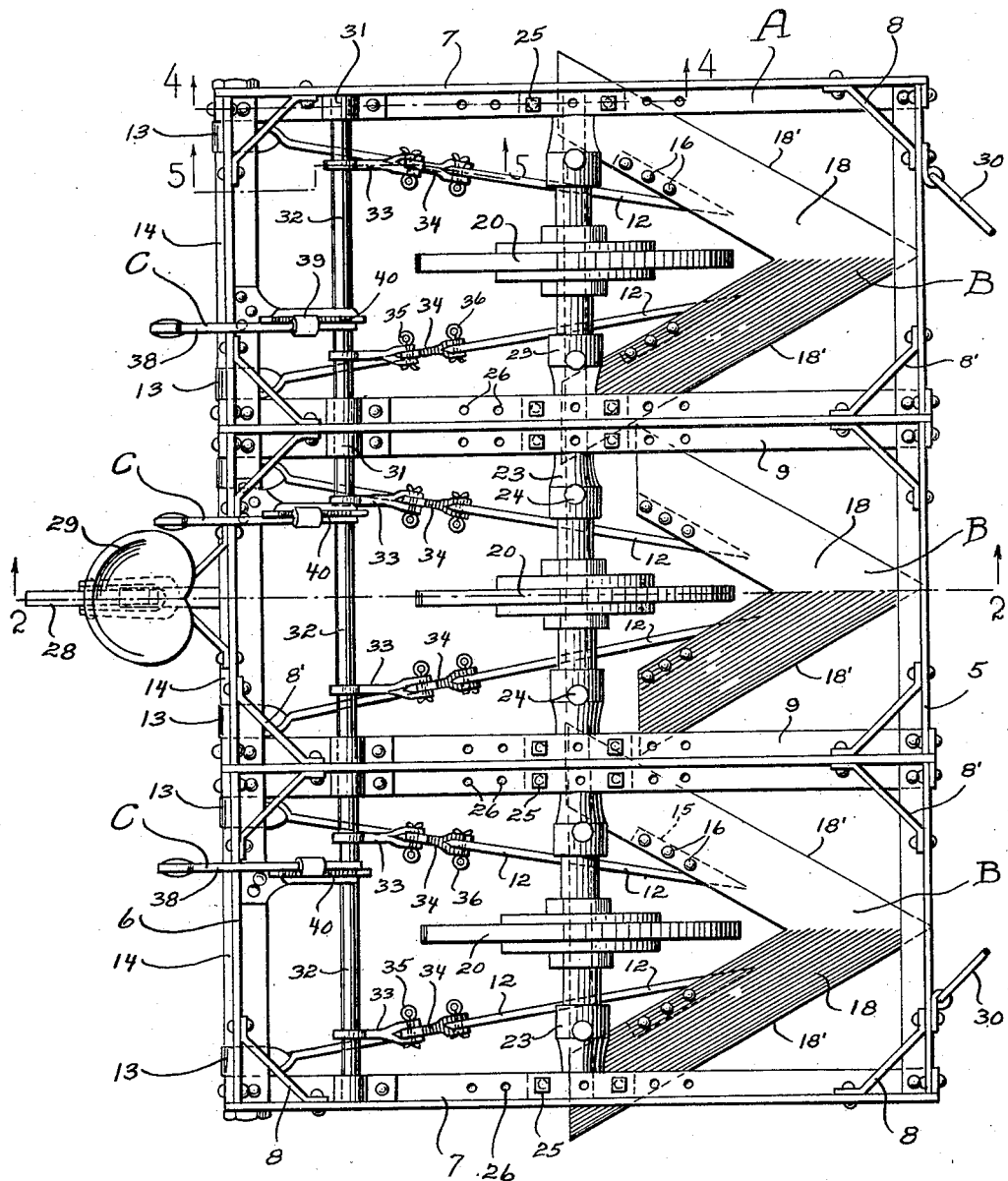
Figure 1 is a top plan view of the improved weed skinner constructed with three skinner units.

In the drawings, and wherein similar reference characters designate corresponding parts thruout the several views, the improved skinner comprises a main frame A of rectangular shape providing front and rear rails 5 and 6 respectively and side rails 7, the frame rails preferably being formed of angle iron riveted or otherwise suitably connected at their ends and reinforced by the angle braces 8. Connecting the front and rear rails is a pair of intermediate rails 9 preferably of T-shape and arranged with the web portions uppermost. The web portions of the intermediate rails 9 are preferably braced at their ends to the rails 5 and 6 by the diagonal braces 8'. By observing Figure 1, it will be seen that the frame rails 5, 6, 7 and 9 provide three rectangular-shaped frame sections.

Arranged beneath each frame section is a skinner or cutter unit B capable of being raised and lowered by an adjusting means C.

Supported in parallel relation below the rear frame rail 6 as by suitable hangers 10 is a pivot shaft 11 which extends transversely the length of the frame and serves as a pivotal support for the rear ends of the skinner units B.

Figure 2:
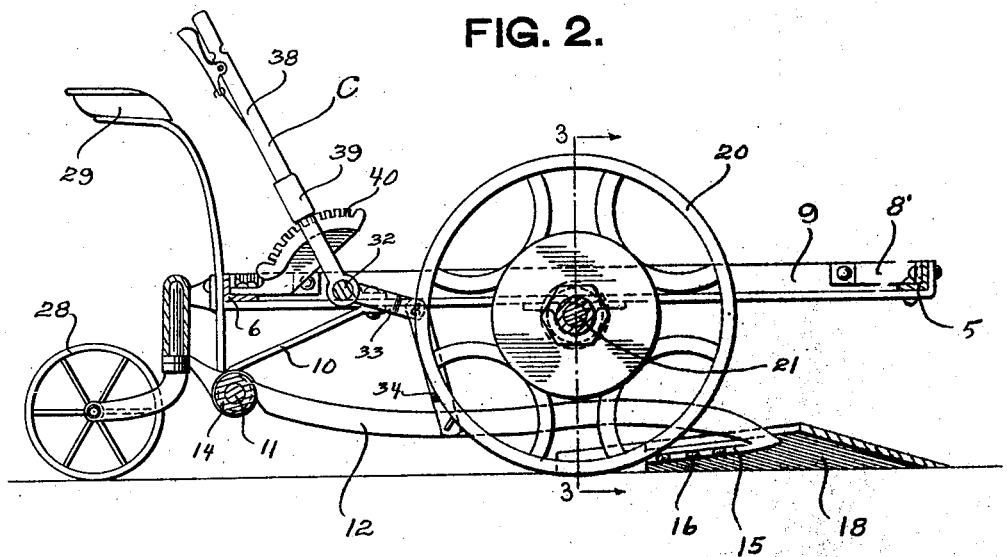
Figure 2 is a section substantially on the line 2—2 of Figure 1.
Figure 3:
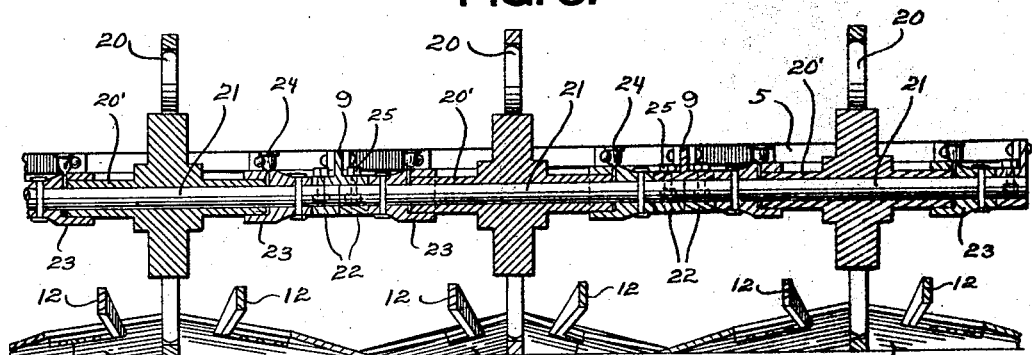
Figure 3 is a fragmentary section on the line 3—3 of Figure 2.
Figures 4, 5:
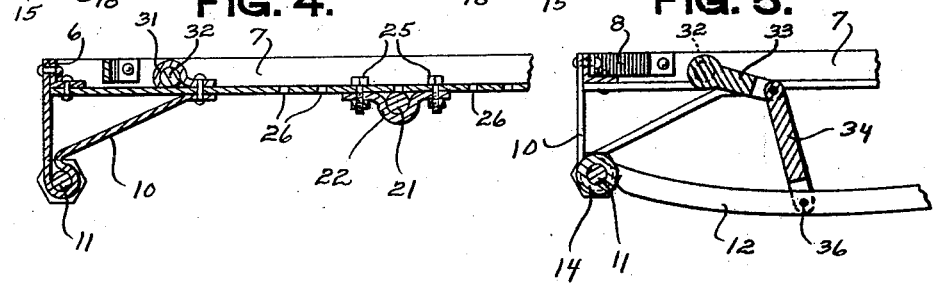
Figures 4 and 5 are fragmentary sections on the respective lines in Figure 1.

The skinner units B each comprises a pair of rearwardly diverging push rods or beams 12 which are preferably arcuated slightly as shown in Figure 2 and have their rear ends provided with a quarter turn and rolled to provide a pivot eye 13 for pivotal mounting upon the shaft 11. The rear pivot ends of the push rods 12 are held in proper spaced relation along the shaft 11 by suitable spacing sleeves 14 arranged between each companion pair of rods. The forward ends of the arms 12 are spaced apart and provided with outward and rearwardly extending extensions 15 to which are attached as by bolts, rivets or the like 16, the rearwardly diverging blades or wings of a V-shaped cutter 18, having its apex arranged on a line midway between the diverging push rods 12.

Arranged between the push rods 12 of each skinner unit is a combined supporting and clearing wheel 20 serving as supporting wheels for the frame A and as means for bending the weeds downwardly between the push rods to prevent hanging of the weeds upon any portion of the skinner structure. These clearing wheels 20 are arranged between the rearwardly diverging blades of the cutters 18 and each has free rotation upon an axle shaft 21 mounted at its ends in suitable supporting brackets 22 adjustably carried beneath the rails 7 and 9. These axle shafts 21 are mounted in axial alignment and each is provided with a pair of dust caps 23 having sleeve portions engaging over opposite ends of the clearing wheel hubs 20'. The caps 23 may each be provided with a suitable grease or oil cup 24. The supporting brackets 22 are preferably secured to the frame rails by means of bolts 25, and the frame rails 7 and 9 are provided along their horizontal flange portions with suitable adjustment openings 26 permitting adjustment of the supporting and clearing wheels forwardly and rearwardly in the frame. While in the example shown, a separate axle shaft 21 is provided for each wheel 20 to permit individual mounting of the wheels it is to be understood that if so desired a continuous axle shaft may be provided for the clearing wheels.

As will be observed in Figures 1 and 2, the clearing wheels 20 are arranged midway between the push rods and operate between the diverging blades of the V cutters. It will further be noted in Figure 1 that the blades of the end cutters are longer than the blades of the center cutter and overlap so that no stand of weeds is left between the cutters. The combined supporting and clearing wheels 20 are mounted substantially midway between the rails 5 and 6 and are of such size as to support the pivot shaft 11 at an elevation well above the ground surface so as to clear obstructions and readily pass over weeds flattened upon the ground by the wheels. The rear of the frame A is preferably supported by a suitable swivel or caster wheel 28 arranged midway between the end rails 7 and suitably attached to the rear rail 6. A suitable seat 29 may be supported above the rear rail 6 midway the ends thereof. Any suitable form of draft coupling 30 may be connected to the front rail 5 for attachment to a tractor, or the machine may be horse drawn if desired.

Journaled in suitable brackets 31 secured to the horizontal flange portion of each of the rails 7 and 9, and one for each of the skinner units B, is a rock shaft 32 and these shafts are mounted in axial alignment as shown in Figure 1. These rock shafts 32 are mounted in axial alignment just forwardly of the rear frame rail 6 and each carries a pair of forwardly extended crank arms 33 having forked ends for pivotal connection to the upper ends of links 34 as by suitable cotter pins or the like 35. The lower ends of the links 34 are preferably forked and are pivotally connected to the push rods 12 as by cotter pins or the like 36 at a location along the rods spaced rearwardly of the axis of the clearing wheels 20. Connected with each rock shaft 32 is a control lever 38 provided with a suitable latch 39 for engaging a toothed sector 40 preferably carried by the rear rail 6. Thus it will be seen that forward and rearward swinging of the levers 38 will act to raise and lower their respective cutters 18. While the provision of three rock shafts 32, one for each of the skinner units B will permit independent adjustment of the cutters, a continuous rock shaft may be provided for unitary raising and lowering of the cutters by means of a single operating lever.

The clearing wheels 20 may either have a plain surface tread as shown or be provided with lugs.

In operation, the skinner units are first adjusted by the levers 38 for disposing the cutters 18 in proper relation to the ground and as the machine is advanced the weeds are skinned or cut by the diagonal cutting edges 18' and fall upon the diverging blades of the cutters. As the weeds are spread rearwardly over the cutters, the rotating clearing wheels 20 operating between each pair of push rods 12, bend the weeds downwardly between the push rods into engagement with the ground. This downward bending of the weeds between the rods 12 clears the rods of the weeds and prevents the weeds from collecting at the links 34 or any other portion of the framing structure rearwardly of the clearing wheels.

The machine may be constructed with one or any desired number of the skinner or cutter units each being provided with a clearing wheel operating at the rear of the cutter between a pair of pivotally mounted push rods.

Thus it will be seen that an improved construction for weed skinners or cutters has been provided which will eliminate collecting and clogging of the cut weeds. It will further be apparent that a novel arrangement has been disclosed whereby a combined supporting and clearing wheel serves to effectively clear the weeds from the cutter supporting bars or rods in advance of any depending portions of the machine upon which the weeds would be likely to collect.

Changes in detail may be made to the form of invention herein shown and described, without departing from the spirit of the invention or the scope of the following claims.

I claim:

1. A weed skinner comprising a main frame, a supporting wheel for the frame, a shaft mounted beneath the rear portion of the frame, a pair of cutter beams pivotally supported at their rear ends upon the shaft and extending forwardly at opposite sides of the wheel, a V-shaped cutter carried by the forward ends of the beams, and adjusting means for raising and lowering the beams, said adjusting means being arranged rearwardly of the supporting wheel.

2. A weed skinner comprising a main frame, a supporting wheel for the frame, a pivot shaft mounted across the rear portion of the frame, a pair of cutter beams pivoted on the shaft and extending forwardly at opposite sides of the wheel, a V-shaped cutter carried by the forward ends of the beams forwardly of the supporting wheel, and elevating means for the beams embodying links having connection with the beams rearwardly of the supporting wheels.

3. A weed skinner comprising a main frame, a supporting wheel for the frame, a pivot shaft mounted beneath the rear portion of the frame, a pair of cutter beams pivoted upon the shaft and extending in forwardly converging relation at opposite sides of the supporting wheel, a cutter carried by the forward ends of the beams forwardly of the wheel, and adjusting means for raising and lowering the beams and having connection with the beams rearwardly of the supporting wheels.

4. A weed skinner comprising a main frame, a supporting wheel for the frame, a shaft mounted beneath the rear portion of the frame, a skinner unit embodying cutter beams arranged one at each side of the supporting wheel and a wing cutter carried by the forward ends of the beams, said beams at their rear ends having pivotal connection upon said shaft, a rock shaft carried by the frame and provided with a crank arm, a link connecting the crank arm and skinner unit rearwardly of the supporting wheel, a lever for rotating the rock shaft for raising and lowering of the skinner unit, and adjustment retaining means for the lever.

5. A weed skinner comprising a main frame embodying front and rear rails and side rails, a ground wheel adjustably supported along the side rails, a shaft supported beneath the rear rail, a pair of cutter beams pivotally mounted at their rear ends upon the shaft and extending forwardly at opposite sides of the ground wheel, a V-cutter carried by the forward ends of the beams, and adjusting means for raising and lowering of the cutter embodying links having connection with the beams rearwardly of the ground wheel.

6. A weed skinner comprising a main frame embodying front and rear rails and parallel side rails, an axle adjustably supported by the side rails, a ground wheel rotatable on the axle, a pair of cutter beams arranged one at each side of the ground wheel, means pivotally supporting the rear ends of the beams beneath the frame, a V cutter carried by the forward ends of the beams, a link connected with each beam rearwardly of the ground wheel, and adjusting means connected with the upper ends of the links for raising and lowering of the cutter beams.

7. A weed skinner comprising a main frame embodying front and rear rails and parallel side rails, a ground wheel supported between the side rails and adjustable longitudinally of the side rails, a shaft supported beneath the rear rail, a pair of cutter beams pivotally supported in spaced relation upon the shaft and extending forwardly at opposite sides of the ground wheel, a cutter carried by the forward ends of the beams, a rock shaft journaled in the side rails rearwardly of the ground wheel, crank arms carried by the rock shaft, links connecting the crank arms and cutter beams, a toothed sector carried by the rear rail, a control lever connected to the rock shaft, and latch means carried by the lever and engageable with the toothed sector for retaining the cutter beams in vertically adjusted positions.

8. A weed skinner comprising a main frame, supporting wheels for the frame, a skinner unit for each wheel each embodying a pair of spaced apart push rods supported at their rear ends below the frame and extending forwardly at opposite sides of the supporting wheels and a cutter carried by the forward ends of the rods, and means for independently raising and lowering the skinner units embodying coupling links having connection with the push rods rearwardly of the supporting wheels.

9. A weed skinner comprising a main frame divided into frame sections, a pivot shaft mounted beneath the rear portion of the frame, a skinner unit for each frame section each embodying a pair of spaced apart cutter beams pivotally mounted at their rear ends upon said shaft and a cutter carried by the forward ends of the beams, a ground wheel journaled in each frame section and arranged between the cutter beams, and adjusting means for each skinner unit having connection with the cutter beams rearwardly of the ground wheels.

10. A weed skinner comprising a main frame divided into frame sections, a pivot shaft mounted beneath the rear portion of the frame, a skinner unit for each frame section each embodying a pair of spaced apart cutter beams pivotally mounted at their rear ends upon said shaft and a cutter carried by the forward ends of the beams, a ground wheel journaled in each frame section and arranged between the cutter beams, adjusting means for raising and lowering of the skinner units having connection with the units rearwardly of the ground wheels, and a caster wheel supporting the rear portion of the frame.

OCE HARTSOCK.